United States Patent Office 3,146,212
Patented Aug. 25, 1964

3,146,212
POLYMERIZATION INHIBITORS FOR HYDROXY PHOSPHONIUM HALIDES CONTAINING NITROGEN COMPOUND ACCELERATOR
George M. Wagner, Lewiston, Paul E. Hoch, Youngstown, and Irving Gordon, Niagara Falls, N.Y., assignors to Hooker Chemical Corporation, Niagara Falls, N.Y., a corporation of New York
No Drawing. Filed Nov. 21, 1960, Ser. No. 70,390
29 Claims. (Cl. 260—2)

This invention relates to a method of inhibiting rapid polymerization of methylol-phosphorus compounds in the presence of nitrogen-containing compounds, and to novel polymerization inhibiting compositions.

Methylol-phosphorus polymers which have nitrogen atoms incorporated in the polymers are known to have excellent flame retarding properties. Such polymers are particularly suitable for treatment of cellulosic materials such as cotton, rayon, wool, jute, ramie, paper, cardboard and the like. Numerous processes have been developed for treating cellulosic materials with these polymers. For example, in one process a cellulosic material such as cotton cloth is impregnated with an aqueous resin solution containing tetrakis(hydroxymethyl)-phosphonium chloride and methylol melamine, the impregnated cloth is dried and then reacted with ammonium hydroxide. Although this technique may be employed to produce a flame-proof cloth, nevertheless, the resulting cloth has a hard finish, since the reaction between ammonia and the methylol-phosphorus polymer is extremely rapid, and a hard, nitrogen-containing polymer forms on the surface of the cloth and blocks or prevents further reaction of ammonia with the methylol-phosphorus polymer on the interior of the cloth fibers. As a result, the polymer on the cloth is not uniform. Furthermore, such a process is undesirable from a commercial standpoint, since the cloth must be treated with two separate solutions, and two separate drying steps must be employed.

In another process the cloth to be treated is impregnated with an aqueous solution containing tetrakis(hydroxymethyl)phosphonium chloride, methylol melamine, and ammonium hydroxide, and the resulting impregnated fabric is dried in air. Such a technique is suitable for treating clothing and the like in the field to render the clothing flameproof and impervious to certain warfare gases. However, this technique is not suitable for treating cellulosic materials on a commercial scale, because of the rapid solidification of the polymer when ammonia is contacted with tetrakis(hydroxymethyl)phosphonium chloride.

In these and other similar reactions wherein polymers containing nitrogen and phosphorus are formed from hydroxyorgano phosphonium chloride compounds and nitrogen-containing compounds, the rapid rate of polymerization has created serious problems when these processes are applied on a commercial scale. While we do not wish to be bound by theory, it is believed that the rapid rate of polymerization in these processes is caused, at least in part, by the presence of an aldehyde such as formaldehyde, which is formed in some stage of the polymerization reaction. We have discovered that when an aldehyde-combining substance is admixed with the hydroxyorgano phosphonium chloride compound, either prior to or simultaneous with the reaction of the phosphonium compound with a nitrogen-containing compound, a marked inhibition of the rate of polymerization is obtained.

It is an object of this invention to provide a novel polymerization inhibitor capable of inhibiting the formation of polymers containing phosphorus and nitrogen.

A further object of the invention is to provide a novel method for inhibiting the rate of polymerization of hydroxyorgano phosphonium chloride compounds and nitrogen-containing compounds.

These and other objects of the invention will be apparent from the following detailed description thereof.

It has now been discovered that when a substance capable of combining with an aldehyde is admixed with a hydroxyorgano phosphonium chloride compound having the formula

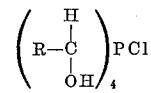

where R is as defined below, and the resulting mixture is reacted with a nitrogen-containing compound to yield a polymer containing nitrogen and phosphorus, there is a marked inhibition of the rate of polymerization. If desired, the substance capable of combining with an aldehyde may be admixed simultaneously with the hydroxyorgano phosphonium chloride compound and the nitrogen-containing compound. Because of the polymerization inhibiting effects of the mixture of the hydroxyorgano phosphonium chloride compound and the aldehyde-combining substance, aqueous solutions containing this mixture and a nitrogen-containing compound are highly stable, and do not readily polymerize or solidify unless subjected to an elevated temperature. As a result, it is now possible to impregnate cellulosic materials with aqueous solutions containing the hydroxyorgano phosphonium chloride compound, the aldehyde-combining substance, and the nitrogen-containing compound and thereby obtain a more complete penetration of the cellulosic material with the resulting polymer.

The term "hydroxyorgano phosphonium chloride compounds" is used throughout the description to define water-soluble tetrakis($\alpha$-hydroxyorgano)phosphonium chloride compounds having the formula

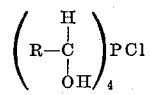

where R is a hydrogen, lower alkyls having between about one and about three carbon atoms, chlorinated lower alkyls having between about one and about three carbon atoms, lower alkenyls having from two to three carbon atoms and lower chlorinated alkenyls having from two to three carbon atoms. Typical examples of suitable water-soluble hydroxyorgano phosphonium compounds are tetrakis(hydroxymethyl)phosphonium chloride, tetrakis($\alpha$-hydroxyethyl)phosphonium chloride, tetrakis($\alpha$-hydroxypropyl)phosphonium chloride, tetrakis($\alpha$-hydroxypropenyl)phosphonium chloride, tetrakis($\alpha$-hydroxybutenyl)phosphonium chloride and mixtures thereof. The phosphonium compound may be used in monomer form or in a partially polymerized form, so long as it is still water-soluble. For example, tetrakis(hydroxymethyl)phosphonium chloride may be heated to effect partial polymerization before dissolving in the aqueous solution.

Suitable substances capable of combining with aldehyde produced by polymerization of a hydroxyorgano phosphonium chloride compound with a nitrogen-containing compound include inorganic sulfites and tertiary amine sulfites. Typical examples of suitable inorganic sulfites include ammonium sulfite, ammonium bisulfite, sodium sulfite, sodium bisulfite, potassium sulfite, potassium bisulfite, lithium sulfite, lithium bisulfite, and mixtures thereof, alkaline earth metal sulfites such as calcium sulfite, calcium bisulfite, barium sulfite, barium bisulfite, magnesium sulfite and mixtures thereof.

Typical examples of suitable tertiary amine sulfites and tertiary amine bisulfites include the sulfites and bisulfites of triethanol amine, triisopropyl amine, triethyl amine, tripropanol amine, tributyl amine, and mixtures thereof. The term "a sulfite" as used throughout the description and claims is intended to include sulfites, bisulfites and mixtures thereof.

If desired, a polymerization inhibiting effect can be obtained by contacting gaseous sulfur dioxide with an aqueous solution containing hydroxymethyl phosphonium chloride compound under alkaline conditions sufficient to convert $SO_2$ to the sulfite ion.

The substance capable of combining with an aldehyde is admixed with the hydroxyorgano phosphonium chloride compound in a proportion equivalent to between about 0.9 and about 2.0 moles, and preferably between about 1.0 and about 1.4 moles per mole of the hydroxyorgano phosphonium chloride compound. However, any proportion capable of inhibiting the polymerization of the hydroxymethyl phosphonium chloride compound and the nitrogen-containing compound may be employed.

The polymerization inhibiting effect obtained by admixing a hydroxyorgano phosphonium chloride compound with one of the aforesaid substances capable of combining with an aldehyde in the presence of a nitrogen-containing compound, can be utilized in any polymerization technique where the rapid rate of polymerization of the hydroxyorgano phosphonium chloride compound or its derivatives with a nitrogen-containing compound creates a problem. For example, when an aqueous solution containing a hydroxyorgano phosphonium chloride compound such as tetrakis(hydroxymethyl)phosphonium chloride, a substance capable of combining with formaldehyde such as sodium sulfite, and a nitrogen-containing compound such as ammonia, ammonium sulfate, ammonium phosphate, ammonium chloride, ammonium bromide, ammonium iodide, ammonium nitrate, and ammonium hydroxide, and the resulting solution is used to impregnate a cellulosic material such as a cellulosic textile, the rate of polymerization is markedly inhibited, thereby permitting substantially complete penetration of the cellulosic textile before polymerization is complete. As a result the nitrogen-phosphorus containing polymer that forms is substantially completely distributed throughout the fibers of the cellulosic textile. Complete distribution of the resulting polymer on the textile in this manner markedly improves the flameproofing properties of the textile and further improves the hand and texture of the resulting treated textile. Other illustrations of processes in which the polymerization inhibiting effect of the mixture of hydroxyorgano phosphonium chloride compound and a substance capable of combining with an aldehyde such as formaldehyde include the process disclosed in United States Patent No. 2,772,188, issued November 27, 1956, to Wilson A. Reeves et al., wherein a hydroxymethyl phosphonium chloride compound is reacted with a water-soluble methylol melamine to yield a further polymerizable methylol-phosphorus polymer and this polymer is then reacted with ammonia to incorporate nitrogen into the polymer. Other processes to which applicant's novel invention can be applied include the processes disclosed in United States Patent No. 2,809,941, issued October 15, 1957, to Wilson A. Reeves et al.; United States Patent No. 2,810,701, issued October 22, 1957, to Wilson A. Reeves et al.; and United States Patent No. 2,812,311, issued November 5, 1957, to Wilson A. Reeves et al. Applicant's novel polymerization inhibiting composition is utilized in the above mentioned processes by substituting a mixture of the hydroxyorgano phosphonium chloride compound and a substance capable of combing with an aldehyde, in the above defined proportions, for the hydroxyorgano phosphonium compound described in these processes.

When a sulfite is employed as the substance capable of combining with formaldehyde, suitable nitrogen-containing compounds that may be employed, in addition to those already mentioned, include primary amines containing at least one amine group, such as methylamine, propylamine, octylamine, decylamine, ethanolamine, propanolamine, cyclicamines such as cyclopentylamine, cyclohexylamine and alkyl substituted derivatives thereof, and such substances as semicarbazides, hydrazines, hydrazides, amino guanidine, ethylenediamine, phenylenediamine, hexamethylenediamine, tetramethylenepentaamine, trimethylenetetraamine and mixtures thereof. Also suitable are the secondary amines containing at least two amine groups such as N,N'-dimethylethylenediamine, N,N'-dimethylhydrazine, N,N' - methylphenylenediamine and mixtures thereof.

The following examples are presented to define the invention more fully without any intention of being limited thereby. All parts and percentages are by weight unless otherwise indicated.

EXAMPLES 1 TO 3

Three aqueous resin solutions were prepared, designated as Solution A, B and C, respectively. Solutions A and B were prepared by dissolving trimethylolmelamine in the desired amount of water, followed by dissolving urea, tetrakis(hydroxymethyl)phosphonium chloride and sodium sulfite in the proportions set forth below in Table A. Prior to the addition of sodium sulfite the pH of the solution containing trimethylolmelamine, urea and tetrakis(hydroxymethyl)phosphonium chloride was about 3.5. After dissolving the sodium sulfite the pH increased to about nine. Ammonium sulfate was then added in the proportions set forth below in Table A. The pH of the resulting solution then varied between about six and about seven. Solution C was prepared in a similar manner by dissolving trimethylolmelamine, triethanolamine, urea and tetrakis(hydroxymethyl)phosphonium chloride in water in the proportions set forth in Table A. The components and proportions of components were as follows:

*Table A*

| Components | Parts in solution | | |
|---|---|---|---|
| | A | B | C |
| Tetrakis(hydroxymethyl) phosphonium chloride | 17 | 17 | 18.0 |
| Trimethylolmelamine | 12 | 12 | 11.4 |
| Urea | 5 | 5 | 10.4 |
| $Na_2SO_3$ | 13 | 13 | |
| $(NH_4)SO_4$ | 2 | 2 | |
| Triethanolamine | | | 3.6 |
| Water | 51 | 50 | 56.6 |
| | 100 | 100 | 100.0 |

A sample of six ounce bleached, undyed cotton twill was then immersed in each of the solutions, and each sample was passed through squeeze rolls to remove excess aqueous resin solution. The moist cloths were weighed and then heated in an oven for about ten minutes at a temperature of three hundred degrees Fahrenheit to effect drying and curing. The treated cloth samples were weighed, scoured, dried and then subjected to the standard char test.

The char test was carried out in accordance with the procedure of the American Association of Textile Chemists and Colorists, Test AATCC 34–1952. In this test a strip of cloth to be tested is secured on each of its long sides in a vertical position, leaving an exposed area of approximately ten inches by two and one-quarter inches. A Bunsen burner is positioned below the bottom of the cloth so that the top of the burner is about three-quarters of an inch from the cloth, and so that the burner produces a flame which is about one and one-half inches high. The flame is produced by burning natural gas in the absence of air. The cloth is exposed to the flame for a period of twelve seconds, and the flame is then turned off. The cloth is then removed from the securing means and a weight is attached to one side of the char, the weight being equivalent to about ten percent of the tear strength of the cloth. The opposite side of the cloth is then pulled to produce a tear along the char. The length of the tear is then measured to determine the char in inches.

The tear strength was determined in accordance with the procedure of the Elmendorf Tear Test, Federal Specification CCC–T–191b, #5132. The tensile strength was determined in accordance with Federal Specification CCC–T–191b, #5100 using a Scott Tensile Tester.

The samples were boiled in a soap solution for three hours, dried and then subjected to the char test. The results of these tests are set forth below in Table B.

*Table B*

| Example | 1 | 2 | 3 |
|---|---|---|---|
| | Solution A | Solution B | Solution C |
| Wet pick-up, percent | 82 | 82 | 78 |
| Resin add-on, percent (dry basis) | 17.2 | 18.4 | 21.8 |
| Char, inches | 3.6 | 3.4 | 3.0 |
| Char after 3 hr. boil, inches | 3.5 | 3.8 | 5.5 |
| Tear strength, grams | 800 | 800 | 670 |
| Hand | Excellent | Excellent | Boardy |

It can be seen from these results that when the instant novel technique is employed, as demonstrated by treating the cloth with Solutions A and B, that a cellulosic material having improved flame-retardant properties and improved hand is readily obtained. For purposes of comparison the cloth treeated with Solution C, a solution disclosed by the prior art, the resulting cloth was flame retardant, but had a poor hand and poor tear strength.

EXAMPLE 4

A solution was prepared by dissolving four hundred grams of tetrakis(hydroxymethyl)phosphonium chloride in eight hundred and forty-two grams of water. Sodium sulfite (two hundred and eighty grams) and sodium meta-bisulfite (twenty-eight grams) were then dissolved in the solution. This solution was stable after storage for several months.

At the end of ten days of storage, a one hundred and sixty gram portion of this solution was formulated into a stable textile treating composition for flame retarding textiles by adding twenty-five grams of methylolmelamine, five grams of urea and five grams of ammonium sulfate. A fabric (six ounce per square yard) was impregnated with this solution, dried, cured at three hundred degrees Fahrenheit for three minutes and scoured. The cloth was flame retardant and the hand of the fabric essentially unchanged.

EXAMPLE 5

After the solution of tetrakis(hydroxymethyl)phosphonium chloride and sodium sulfites of Example 4 had aged two months, a one hundred and sixty gram portion was admixed with five grams of ammonium sulfate and two grams of an aqueous twenty-eight percent solution of ammonia. A stable solution was formed which polymerized readily at elevated temperatures.

EXAMPLE 6

The following solution was prepared.

| Component: | Weight, grams |
|---|---|
| Tetrakis(hydroxymethyl)phosphonium chloride | 19 |
| $Na_2S_2O_5$ | 9.5 |
| NaOH | 4.0 |
| Water | 68 |

To this solution was added six grams $CaCl_2$ in twenty grams of water. Only a faint trace of precipitate formed, indicating that the calcium bisulfite addition product of tetrakis(hydroxymethyl)phosphonium chloride is water soluble.

EXAMPLE 7

Sodium meta-bisulfite (9.5 grams) and calcium chloride (eleven grams) were dissolved in fifty grams of water. A precipitate $Ca_2S_2O_5$ formed immediately. Addition of ten grams of thirty-seven percent formaldehyde solubilized the $Ca_2S_2O_5$ precipitate as the bisulfite addition product.

EXAMPLE 8

An aqueous solution of triethanolamine sulfite was prepared by adding 6.4 grams $SO_2$ to thirty grams triethanolamine in fifty grams water. To this solution was added fifteen grams tetrakis(hydroxymethyl)phosphonium chloride, two grams ammonium sulfate and one gram of an aqueous twenty-eight percent ammonia solution. The resulting solution was still stable after three hours standing at room temperature but polymerized on warming on a steam bath.

EXAMPLE 9

The following aqueous solution was prepared.

| Component: | Weight, grams |
|---|---|
| Tetrakis(hydroxymethyl)phosphonium chloride | 20 |
| $(NH_4)_2SO_3$ | 14.7 |
| $(NH_4)_2SO_4$ | 2.5 |
| Water | 60.8 |
| $NH_4OH$ (twenty-eight percent) | 2.0 |

This solution was stable after three hours standing at room temperature but polymerized after heating on a steam bath.

EXAMPLE 10

The following aqueous solution was prepared.

| Component: | Weight, grams |
|---|---|
| Tetrakis(hydroxymethyl)phosphonium chloride | 20 |
| $K_2SO_3$ | 20 |
| $(NH_4)_2SO_4$ | 2.5 |
| Water | 57.5 |

This solution was stable after three hours standing at room temperature but polymerized after heating on a steam bath.

It will be recognized by those skilled in the art that various modifications within the invention are possible, some of which have been referred to above. Therefore, we do not wish to be limited except as defined by the appended claims.

We claim:

1. A composition comprising a mixture of an hydroxy organo phosphonium chloride compound having the formula

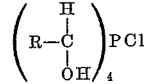

wherein R is selected from the group consisting of hydrogen, lower alkyls having from about 1 to about 3 carbon atoms, lower chlorinated alkyls having from about 1 to about 3 carbon atoms, lower alkenyls, having from about two to about three carbon atoms, and lower chlorinated alkenyls having from about 2 to about 3 carbon atoms, and a sulfite-containing composition selected from the group consisting of ammonium sulfite, ammonium bisulfite, alkali metal sulfites, alkali metal bisulfites, alkaline earth metal sulfites, alkaline earth metal bisufites, tertiary lower alkyl amine sulfites, tertiary lower alkanol amine sulfites, tertiary lower alkyl amine bisulfites, and tertiary lower alkanol amine bisulfites, said composition being stable at room temperature in the presence of a nitrogen-containing compound selected from the group consisting of gaseous ammonia, ammonium hydroxide, ammonium salts of strong inorganic acids, ammonium phosphates, primary alkyl, alkanol, and aryl amines containing at least one amine group and having up to and including ten carbon atoms, cyclic amines having up to
and including six carbon atoms, semi-carbazides, hydrazines, hydrazides, amino quanidine, and secondary alkyl,
alkanol, and aryl amines containing at least two amine
groups and having up to and including 10 carbon atoms,
said phosphonium compound being capable of reacting
with said nitrogen-containing compound at elevated temperatures to form a polymerization product containing
the phosphonium compound and the nitrogen-containing
compound, and an aldehyde which is prevented from accelerating the rate of the polymerization by combination
of the aldehyde with the sulfite-containing compound.

2. The composition of claim 1 wherein said mixture
contains between about 0.9 and about two moles of said
sulfite composition per mole of said phosphonium chloride compound.

3. The composition of claim 1 wherein said mixture
contains between about one and about 1.4 moles of said
sulfite composition per mole of said phosphonium chloride compound.

4. The composition of claim 1 wherein said phosphonium chloride compound is tetrakis(hydroxymethyl)-phosphonium chloride.

5. The composition of claim 1 wherein said sulfite composition is an alkali metal sulfite.

6. The composition of claim 1 wherein said sulfite composition is sodium sulfite.

7. The composition of claim 1 wherein said sulfite composition is potassium sulfite.

8. The composition of claim 1 wherein said sulfite composition is ammonium sulfite.

9. The composition of claim 1 wherein said sulfite composition is calcium sulfite.

10. The composition of claim 1 wherein said sulfite composition is a tertiary lower alkanol amine sulfite.

11. The composition of claim 10 wherein said sulfite composition is triethanolamine-sulfite.

12. A room temperature stable composition comprising an hydroxy organo phosphonium chloride compound having the formula

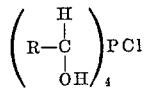

wherein R is selected from the group consisting of hydrogen, lower alkyls having from about 1 to about 3 carbon
atoms, lower chlorinated alkyls having from about 1 to
about 3 carbon atoms, lower alkenyls having from about
2 to about 3 carbon atoms, and lower chlorinated alkenyls
having from about 2 to about 3 carbon atoms, a sulfite-containing composition capable of combining with an
aldehyde, said sulfite containing composition being selected from the group consisting of ammonium sulfite,
ammonium bisulfite, alkali metal sulfites, alkali metal bisulfites, alkaline earth metal sulfites, alkaline earth metal
bisulfites, tertiary lower alkyl amine sulfites, tertiary lower alkanol amine sulfites, tertiary lower alkyl amine bisulfites, and tertiary alkanol amine bisulfites, and
a nitrogen-containing compound selected from the group
consisting of gaseous ammonia, ammonium hydroxide,
ammonium salts of strong inorganic acids, ammonium
phosphates, primary alkyl, alkanol, and aryl amines containing at least one amine group and having up to and
including 10 carbon atoms, cyclic amines having up to
and including 6 carbon atoms, semicarbazides, hydrazines, hydrazides, amino quanidine, and secondary alkyl,
alkanol, and aryl amines containing at least two amine
groups and having up to and including 10 carbon atoms,
said phosphonium chloride compound being capable of
reacting with said nitrogen containing compound in the
presence of said sulfite containing composition at elevated temperatures to form a polymerization product
containing the phosphonium chloride compound and the
nitrogen-containing compound, and an aldehyde which
is prevented from accelerating the rate of the polymerization by combination of the aldehyde with the sulfite-containing compound.

13. The composition of claim 12 wherein the proportion of said sulfite composition in said polymer forming
compositions is between about 0.9 and about two moles
of said sulfite composition per mole of said phosphonium
chloride compound.

14. The composition of claim 12 wherein said phosphonium chloride compound is tetrakis(hydroxymethyl)-phosphonium chloride.

15. The composition of claim 12 wherein said sulfite
composition is an alkali metal sulfite.

16. The composition of claim 12 wherein said nitrogen-containing compound is an ammonia-containing compound.

17. The composition of claim 12 wherein said nitrogen-containing compound is ammonium hydroxide.

18. The composition of claim 12 wherein said nitrogen-containing compound is ammonium sulfate.

19. A process for preparing polymers containing nitrogen and phosphorus which comprises combining a nitrogen-containing compound selected from the group consisting of gaseous ammonia, ammonium hydroxide, ammonium salts of strong inorganic acids, ammonium phosphate, primary alkyl, alkanol, and aryl amines containing at least one amine group and having up to and including 10 carbon atoms, cyclic amines having up to and
including 6 carbon atoms, semicarbazides, hydrazines,
hydrazides, amino quanidine, and secondary alkyl, alkanol, and aryl amines containing at least two amine groups
and having up to and including 10 carbon atoms, an hydroxyorgano phosphonium chloride compound having the
formula

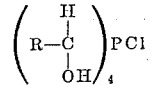

wherein R is selected from the group consisting of hydrogen, lower alkyls having from about 1 to about 3
carbon atoms, lower chlorinated alkyls having from about
1 to about 3 carbon atoms, lower alkenyls having from
about 2 to about 3 carbon atoms, and lower chlorinated
alkenyls having from about 2 to about 3 carbon atoms,
and a sulfite-containing composition capable of combining with an aldehyde, said sulfite containing composition
being selected from the group consisting of ammonium
sulfite, ammonium bisulfite, alakli metal sulfites, alkali
metal bisulfites, alkaline earth metal sulfites, alkaline
earth metal bisulfites, tertiary lower alkyl amine sulfites,
tertiary lower alkanol amine sulfites, tertiary lower alkyl
amine bisulfites, and tertiary lower alkanol amine bisulfites, and heating the resulting composition to an elevated
temperature above room temperature, whereby polymerization of the phosphonium chloride compound and the
nitrogen-containing compound is effected and there is
formed an aldehyde which is prevented from accelerating
the rate of the polymerization by combination of the aldehyde with the sulfite-containing compound.

20. The process of claim 19 wherein the proportion of
said sulfite composition is between about 0.9 and about
two moles of said sulfite composition per mole of said
phosphonium chloride compound.

21. The process of claim 19 wherein the proportion
of said sulfite composition is between about one and
about 1.4 moles of said sulfite composition per mole of
said phosphonium chloride compound.

22. The process of claim 19 wherein said phosphonium
chloride compound is tetrakis(hydroxymethyl)phosphonium chloride.

23. The process of claim 19 wherein said sulfite compound is an alkali metal sulfite.

24. The process of claim 19 wherein said sulfite composition is sodium sulfite.

25. The process of claim 19 wherein said sulfite composition is potassium sulfite.

26. The process of claim 19 wherein said sulfite composition is ammonium sulfite.

27. The process of claim 19 wherein said sulfite composition is calcium sulfite.

28. The process of claim 19 wherein said sulfite composition is a tertiary lower alkanol amine sulfite.

29. The process of claim 28 wherein said sulfite composition is triethanolamine-sulfite.

References Cited in the file of this patent

UNITED STATES PATENTS

| | | |
|---|---|---|
| 2,730,516 | Suen et al. | Jan. 10, 1956 |
| 2,892,803 | Reeves et al. | June 30, 1959 |

FOREIGN PATENTS

| | | |
|---|---|---|
| 1,041,957 | Germany | Oct. 30, 1958 |